United States Patent [19]

Morris

[11] 3,877,599

[45] Apr. 15, 1975

[54] EGG TRAY
[75] Inventor: Robert C. Morris, Trappe, Md.
[73] Assignee: Multifax Corporation, Easton, Md.
[22] Filed: Aug. 3, 1973
[21] Appl. No.: 385,548

[52] U.S. Cl.................................. 217/26.5; 229/2.5
[51] Int. Cl... B65d 25/02; B65d 81/00; B65d 85/00
[58] Field of Search ................ 217/21, 29, 26, 26.5; 206/9; 229/2.5

[56] References Cited
UNITED STATES PATENTS
3,282,458  11/1966  Rudd ................................ 217/26.5
3,451,577  6/1969  Nurick .............................. 217/26.5

Primary Examiner—Leonard D. Christian
Attorney, Agent, or Firm—Howson and Howson

[57] ABSTRACT

Egg trays for containing and transporting eggs in successive layers. Each tray comprises a plurality of egg-supporting cups disposed in transverse and longitudinal rows. The cups have a solid bottom and are designed to receive the bottom tip of the egg. Lateral support for the eggs is provided by upstanding pedestals spaced around the cup at four corners. The pedestals are hollow and all except a selected few are open at the top and split longitudinally so as to provide a resilient flexible skirt for lateral support for the eggs. The selected few of the pedestals are closed at the top to engage against the bottoms of cups in the upwardly adjacent tray to support the latter. Selected pedestals and cups interlock to provide lateral support as well as vertical support. The trays are preferably a molded one-piece construction of resilient plastic material such as low-density polyethylene.

5 Claims, 7 Drawing Figures

EGG TRAY

The present invention relates to egg trays, and has particular application to egg trays for containing and transporting a plurality of eggs. The invention has particular utility in the transporting of eggs from the laying house either to the egg processing plant for preparation for market or to the hatchery for incubation.

Egg trays are commonly used to support and separate the eggs in crates. Originally, a lattice of intersecting card-board strips was positioned in the crates and the eggs were deposited into the cells provided by the strips. Upon filling of each layer, flats were laid over the lattice and a fresh layer was started. As an improvement upon this procedure, molded pulp filler-flats were provided which performed the dual function of supporting the eggs in each layer and separating the eggs within that layer. The use of the molded pulp filler-flat enabled the flat to be loaded independently and transferred into the crates while in a loaded condition. The inherent flexibility of the molded pulp flats permitted inadvertent crushing of the eggs in the handling of the loaded flats, particularly when the eggs were of large size. When an egg is broken in a pulp flat, the flat becomes dirty and must be discarded. Furthermore, the pulp flats are normally molded from a continuous sheet of material and do not provide for ventilation of the eggs within the cells of the flat. Because of the lack of ventilation, the eggs in the flats tend to retain the body heat of the eggs and furthermore, the nature of the pulp tends to extract moisture from the eggs at the elevated temperature. Such moisture loss accelerates the deterioration of the eggs.

Various attempts have been made to overcome the undesirable features of the molded pulp flats by the manufacture of flats from plastic material. The plastic flats which are available have not been entirely satisfactory because of the possibility of excessive breakage of the eggs during handling and the likelihood of the material from the broken eggs contaminating the other eggs in the tray or in the stack of trays.

With the foregoing in mind, the present invention provides a molded egg tray which is sufficiently rigid to avoid damage to the eggs by reason of flexure of the tray during handling of the loaded trays and yet which is sufficiently resilient to cushion the eggs against the damage.

Another object of the present invention is to provide an egg tray which may be used for containing and supporting eggs of varying sizes from the smallest to the largest.

Still another object of the invention is to provide a tray which affords ample ventilation of the eggs when they are contained in the tray and which, at the same time, reduces the chances for contamination of other eggs in the event of breakage of a single egg.

Still another object of the invention is to provide a tray which is readily cleaned and sanitized and is therefore long-lived in operation and use.

The invention also provides trays which may be stacked in multiple layers without danger of lateral displacement and toppling of the uppermost trays, and which may also be nested when empty to occupy a minimum space.

The present invention provides an egg tray which is of a one-piece plastic construction which is fully effective in operation and use and yet which is economical to produce.

All of the objects of the invention are more fully set forth hereinafter with reference to the accompanying drawing, wherein:

FIG. 1 is a top plan view of an egg tray embodying the present invention;

FIGS. 2 and 3 are sectional views taken on the stepped section lines 2—2 and 3—3 respectively of FIG. 1;

Figure 5:
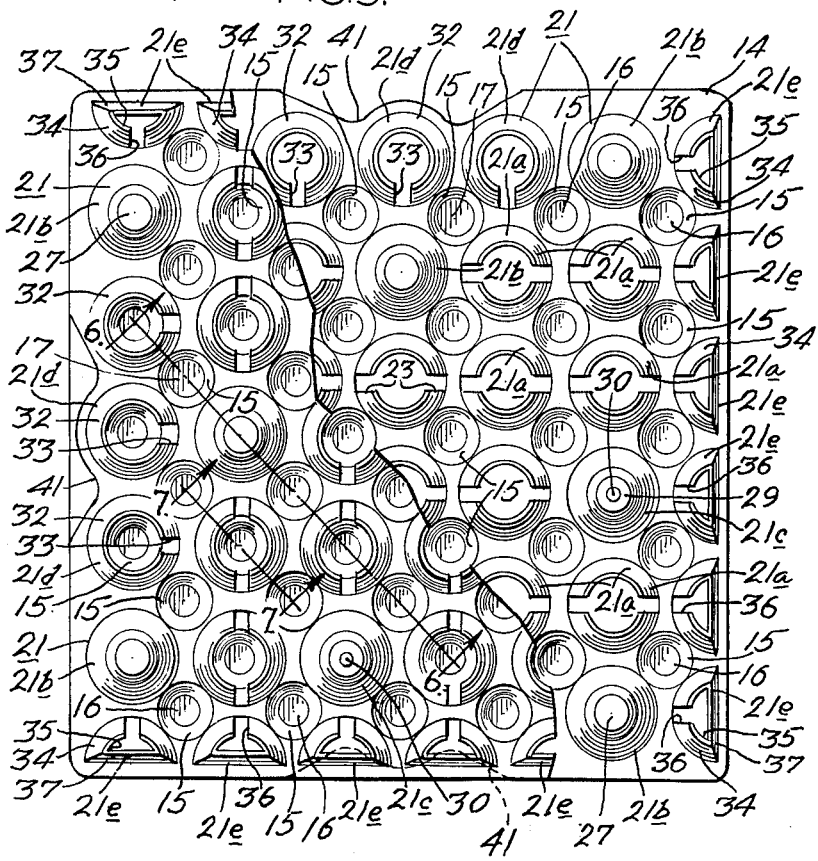
FIG. 5 is a top plan view showing a stack of trays with the top tray broken away to illustrate the ninety degree reorientation of the successive trays in the stack.
Figure 7:
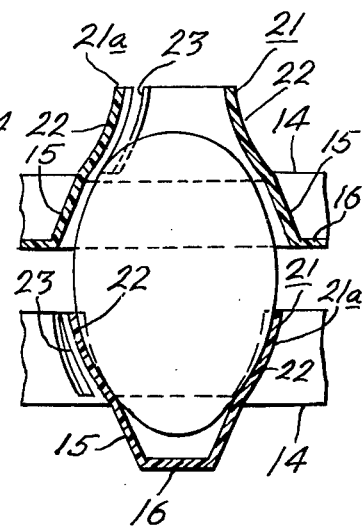
Figure 6:
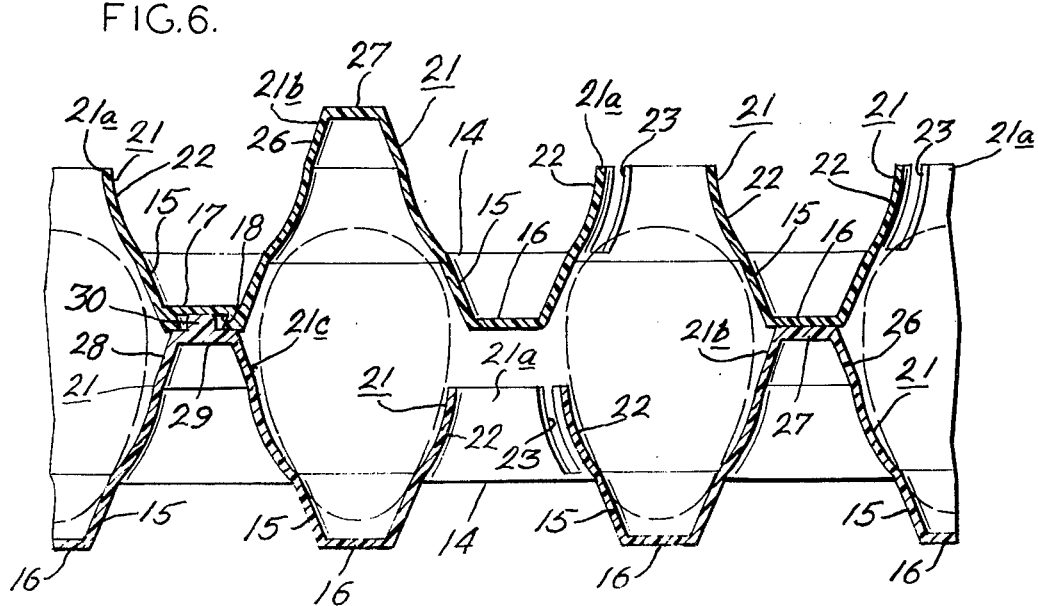

FIG. 6 is an enlarged sectional view illustrating the interlock between the successive trays in the stack and showing in broken lines an egg of conventional small size contained in the stack, as seen on the diagonal section line 6—6 of FIG. 5; and FIG. 7 is an enlarged sectional view taken on the line 7—7 of FIG. 5 illustrating the deflection of the supporting skirts by an egg of conventional large size.

In the gathering of eggs, the eggs are collected in the laying house in trays which are placed empty on a carrier or conveyor. The trays are filled with eggs and the filled trays are conveyed to a packing area where the trays are deposited in crates or other containers. The crates or containers are used to transport the eggs to the next operation which may be an incubation room for fertile eggs or a sorting and grading room for market eggs.

During handling, the eggs are subject to breakage and it is desirable to limit the spillage of the broken eggs so that the broken eggs do not contaminate the other eggs being handled. Furthermore, during handling it is desirable to provide ample ventilation for the eggs to expedite the loss of animal heat and the cooling of the eggs to a safe temperature.

The present invention provides an egg tray which is designed to confine the spillage of a broken egg and at the same time provide ample ventilation when the egg trays are stacked on top of the other. The trays of the present invention are of a uniform size and shape so that they may be readily nested one upon the other and shipped in a confined space. By the same token, the design is such that the trays may be stacked in vertically-spaced relation to accommodate egg therebetween by simply reorienting alternate trays ninety degrees.

With reference to the drawings, the tray of the present invention comprises a flat base 14 which, in the present instance, is of a relatively thin plastic material which has a degree of resilience, for example, low density polyethylene. A series of egg-supporting cups 15 depend below the base 14 and are disposed in transverse and longitudinal rows. In the present instance, all of the cups 15 are of uniform size at the top and have a frustoconical sidewall with a thickness corresponding to the thickness of the base. The walls converge downwardly and terminate in bottom walls. The majority of the cups 15 have plain bottom walls 16 but selected cups are provided with recessed bottom walls 17 which provide a downwardly-facing socket 18 on the underside. As shown in FIGS. 6 and 7, the tops of the cups engage the small end of eggs of conventional size ranging from small to large and support these eggs in an upstanding position as shown.

In order to provide lateral support for the eggs, upstanding projections 21 are provided on the base 14.

Figure 1:
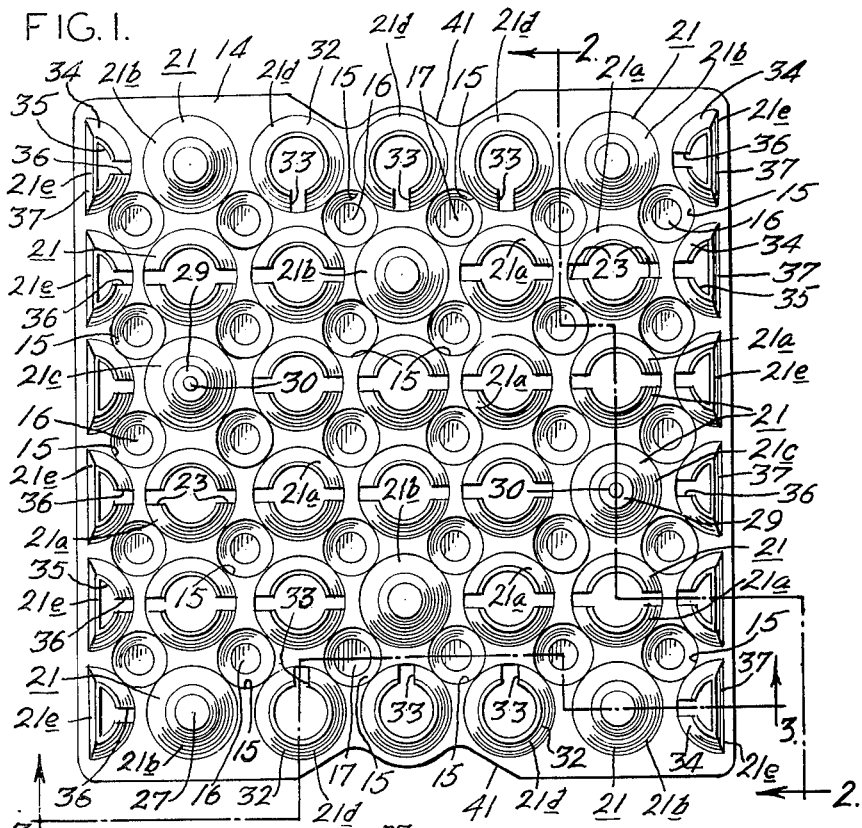
Figure 2:
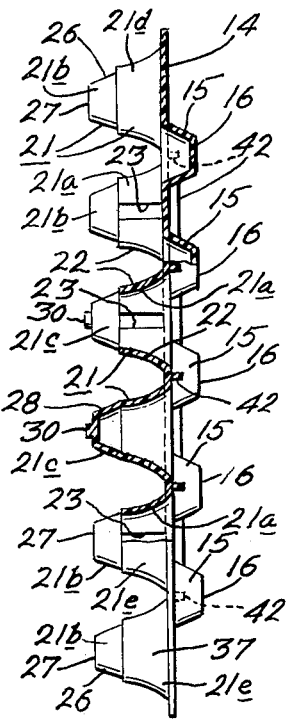
Figure 3:
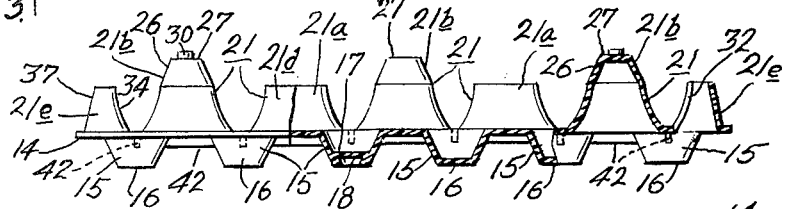
Figure 4:
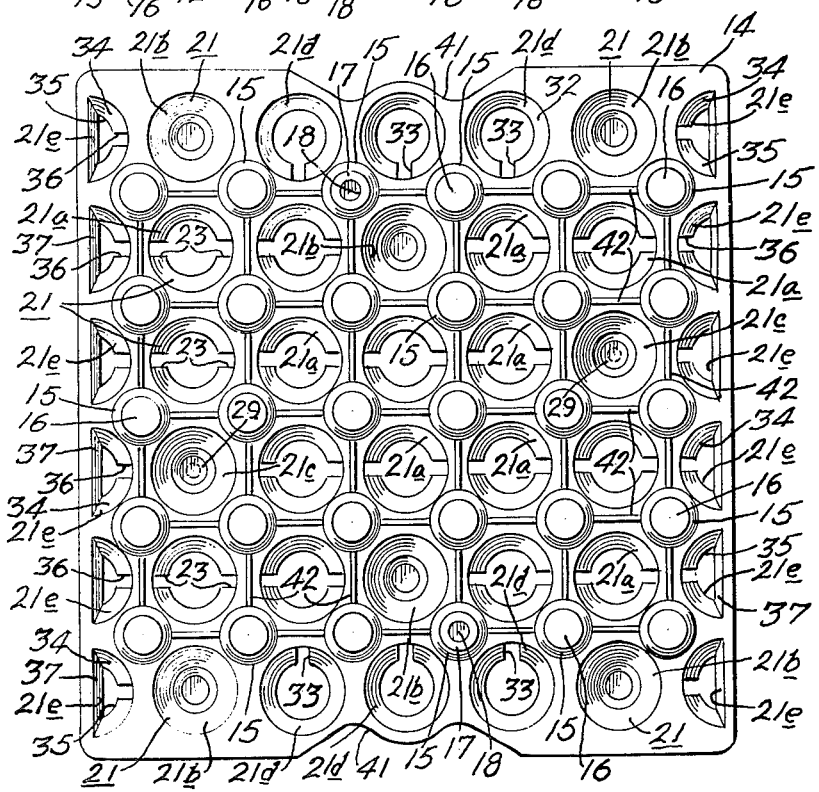
FIG. 4 is an inverted plan view of the tray shown in FIG. 1.

The projections 21 are disposed in longitudinal and transverse rows which are intermediate the rows of cups and are staggered relative thereto. Thus, as shown in FIG. 1, the upstanding projections 21 are positioned at the four corners of each cup 15. The projections 21 all have frustoconical walls upstanding from the base 14 with a thickness corresponding substantially to the thickness of the base. It should be noted that the upwardly converging walls of the projections 21 have a slight inward curvature to accommodate to the curved outline of the egg.

The majority of the projections, which are designated 21a in the drawings, comprise a pair of generally semicircular skirts 22 confronting one another to provide a segmented pedestal which is open at the top. As shown in FIGS. 6 and 7, the tops of the skirts 22 reach about the midpoint of the upstanding eggs in the tray. The semicircular skirts terminate in spaced relation to one another to provide slots 23 which permit inward flexing of the skirt when eggs of large size are positioned in the adjacent cups. It should be noted that the semicircular form of the skirts provides a funnel-like four-point rounded support for the sides of the eggs so as to gently guide the egg into position into the cup 15. When viewed in plan, the pedestal is tangential to the cup and at the point of tangency the sidewalls are substantially aligned. In the event of breakage, any spillage from the egg is received within the cup and there is little tendency for the spillage to flow onto other eggs in ajoining cups or in trays underlying the broken egg.

Other projections 21 of the tray, designated 21b in the drawings, comprise pedestals in which the frustoconical walls 26 terminate in a flat top 27. As set forth more fully below, the flat tops of the pedestals 21b provide a support for a tray stacked above the pedestal 21b by engaging the undersurface of the plain bottom 16 of the cups 15. These pedestals are positioned at locations spaced apart across the entire area of the tray in order to provide support for the next upper tray throughout its entire area.

In order to provide lateral support for the trays to enable stacking of the trays independently of any other container, selected projections 21 are provided with interlocking means, as shown at 21c in the drawings. The pedestals 21c comprise a frustoconical wall 28 having a closed top at 29 with an upstanding post 30 which is adapted to engage in the socket 18 of the socketed bottom wall 17 of the cups 15. The sockets 18 are arranged to engage with the posts 30 when the trays are rotated 90 degrees about the vertical axis and stacked as shown in FIG. 5. With this arrangement, support against lateral displacement of the upper trays is provided so that trays of this character may be stacked to a plurality of levels independently of any container or casing. Trays have been stacked in ten or twelve levels without toppling, although the normal egg case contains only six levels of trays.

At the outside ends of the rows of projections 21 are of a different form. The projections on two sides, as indicated at 21d in the drawings, comprise upstanding frustoconical skirts 32 which are circular in form except for a single slot as indicated at 33. On the other two sides, as indicated at 21e, the projections comprise upstanding skirts 34 having a semicircular portion 35 interrupted by a slot 36, and a flat portion 37 formed integrally with the semicircular portion 34.

In order to facilitate placement of the trays into cases or crates, the opposite sides of the base 14 are recessed as indicated at 41 to provide fingerholds which will enable the handler to insert and remove the trays from the confined cells of an egg crate.

In order to provide sufficient rigidity for the trays when they are being handled without the support of an egg case, and at the same time maintain the desired resilient flexibility to provide the cushioned support for the individual eggs, the base 14 is reinforced. To this end, the underside of the base 14 is provided with ribs 42 which are aligned with the rows of cups 15 and span between adjacent cups in each row. The reinforcing ribs which extend along the rows of cups between the fingerholds provided by the cutouts 41 rigidify the base 14 so that it is readily handled without damage to the eggs loaded thereon. In the illustrated tray, the ribs 42 extend between all of the cups and are disposed both longitudinally and transversely of the tray. In practice, it appears that the ribs tend to cause the loaded tray to blow slightly so as to be slightly upwardly convex when loaded with eggs. This upward convex form of the tray provides further rigidity against collapse in the opposite direction when loaded and further reduces the chance for the eggs to become broken during handling.

The illustrated embodiment of the invention comprises a square tray in which the stacking is accomplished by rotating the tray ninety degrees about the central upright axis. A similar function may be obtained with elongated rectangular trays where the tray is designed to be rotated one hundred eighty degrees about its vertical axis for stacking purposes. Such a modification requires a relocation of the interlocking posts and sockets, but this is readily accomplished. Trays of other forms may also be designed to nest and stack in a similar manner. Thus, while a particular embodiment of the present invention has been herein illustrated and described, it is not intended to limit the invention to such disclosure but changes and modifications may be made therein and thereto within the scope of the following claims.

I claim:

1. An egg tray comprising a base portion having a plurality of depending egg-supporting cups arranged in transverse and longitudinal rows therein, said cups being of uniform size at the top and having converging sidewalls terminating at the bottom in a closed bottom wall, said base having also upstanding projections thereon, said projections arranged in transverse and longitudinal rows intermediate the transverse and longitudinal rows of cups and staggered relative thereto whereby said projections are offset from both the longitudinal and transverse rows of cups, said upstanding projections comprising upwardly converging walls aligned with the downwardly converging walls of the cups at the points of intersection between said projections and said cups, the walls of a majority of said upstanding projections terminating at a level corresponding to the medial portion of the eggs supported in the cups and comprising frustoconical generally semicircular pairs of upstanding skirts spaced from one another to provide vertical slots therebetween for air circulation therethrough, said walls being open at the top to provide substantial air circulation around said eggs and providing convex arcuate surfaces having sufficient flexibility to cushion and resiliently support the sides of eggs of different sizes in the cups.

2. A tray according to claim 1 wherein selected projections comprise upstanding pedestals having a continuous converging frustoconical wall terminating at its upper end in a closed top above the level of the open tops of the remaining projections.

3. A stack of identical trays according to claim 1, wherein an upper tray is supported on a lower tray, the bottoms of the egg-supporting cups being adapted to engage upon the tops of said pedestals, at least two of said bottoms having sockets therein for receiving said posts.

4. A tray according to claim 1 wherein said tray is rectangular and the longitudinal side edges thereof are recessed to provide handholds, said base including ribs extending along the underside of said base transversely between the cups and united therewith to rigidify said base.

5. A tray according to claim 4 including ribs extending along the underside of said base longitudinally between said cups to further rigidify said base.

* * * * *